C. A. DUNHAM.

THERMOSTATIC CONTROLLER.

APPLICATION FILED DEC. 11, 1914.

Reissued Apr. 13, 1915.

13,900.

2 SHEETS—SHEET 1.

WITNESSES

Geo. A. Lenox

E. A. Hannish

INVENTOR

Clayton A. Dunham

BY Ro. Hardie

ATTORNEY

C. A. DUNHAM.

THERMOSTATIC CONTROLLER.

APPLICATION FILED DEC. 11, 1914.

Reissued Apr. 13, 1915.

13,900.

2 SHEETS—SHEET 2.

WITNESSES

Geo. A. Semor

E. A. Hannish

INVENTOR

Clayton A. Dunham

BY Robt Hardie

ATTORNEY

UNITED STATES PATENT OFFICE.

CLAYTON AUBRA DUNHAM, OF MARSHALLTOWN, IOWA, ASSIGNOR TO C. A. DUNHAM CO., INC., OF MARSHALLTOWN, IOWA.

THERMOSTATIC CONTROLLER.

13,900. Specification of Reissued Letters Patent. Reissued Apr. 13, 1915.

Original No. 865,171, dated September 3, 1907, Serial No. 264,535. Application for reissue filed December 11, 1914. Serial No. 876,753.

*To all whom it may concern:*

Be it known that I, CLAYTON AUBRA DUNHAM, a citizen of the United States, and a resident of Marshalltown, in the county of Marshall and State of Iowa, have invented a new and Improved Thermostatic Controller, of which the following is a full, clear, and exact description.

My present invention relates to an improvement in thermostatically operated controlling devices of the same general type as the drain valve disclosed in my prior patent numbered 735,733, August 11, 1903, and the steam trap disclosed in my prior patent numbered 753,557, March 1, 1904.

The invention is useful primarily as a steam trap where it is desired to operate the valve according to temperature changes.

The object of my present invention is principally to improve the construction and assemblage of the chambered expansion member which is employed to actuate the valve, rendering the expansion member more sensitive and at the same time more durable and easier of operation than such members previously constructed.

The invention involves various other changes of major or minor importance, all of which will be fully set forth hereinafter and particularly pointed out in the claims.

Reference is to be had to the accompanying drawings which illustrate as examples two embodiments of my invention, in which drawings like characters of reference indicate like parts in the several views, and in which—

Figure 1:
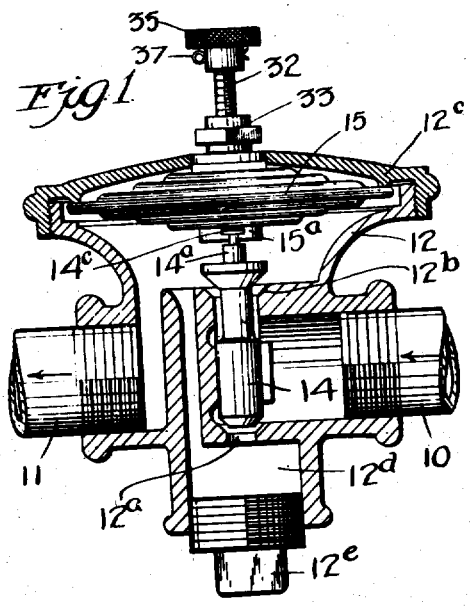
Figure 2:
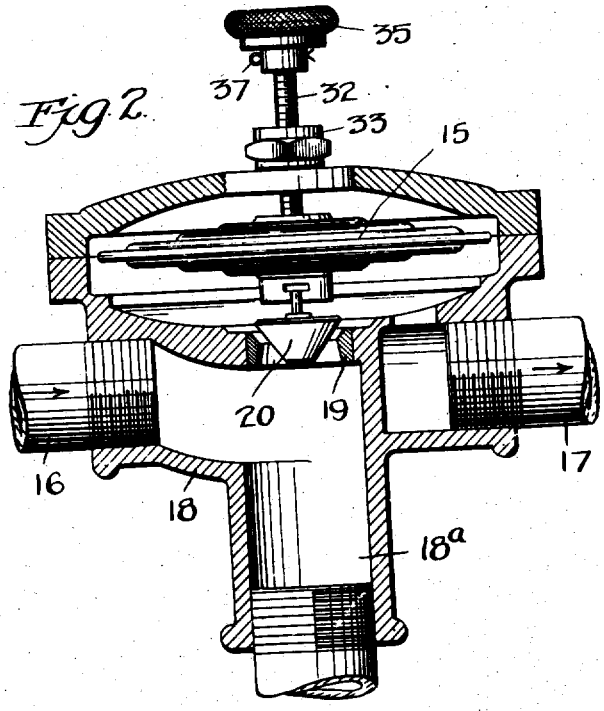
Figure 3:
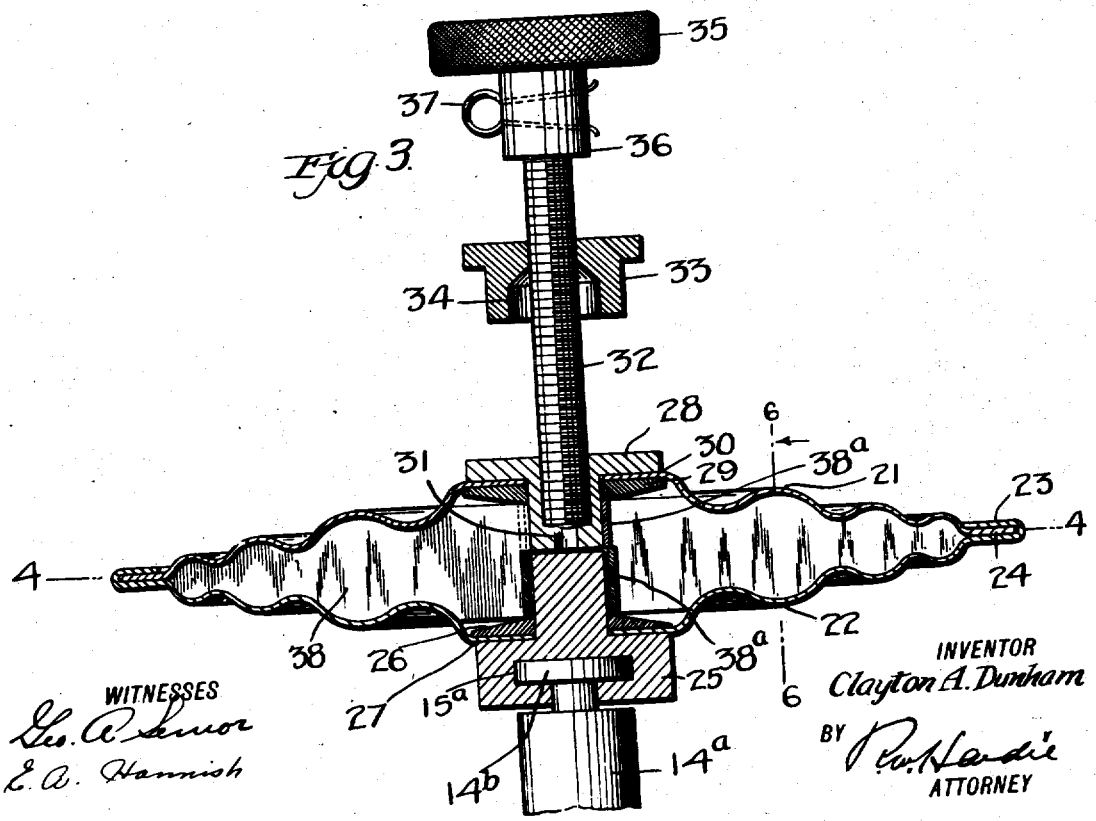
Figure 4:
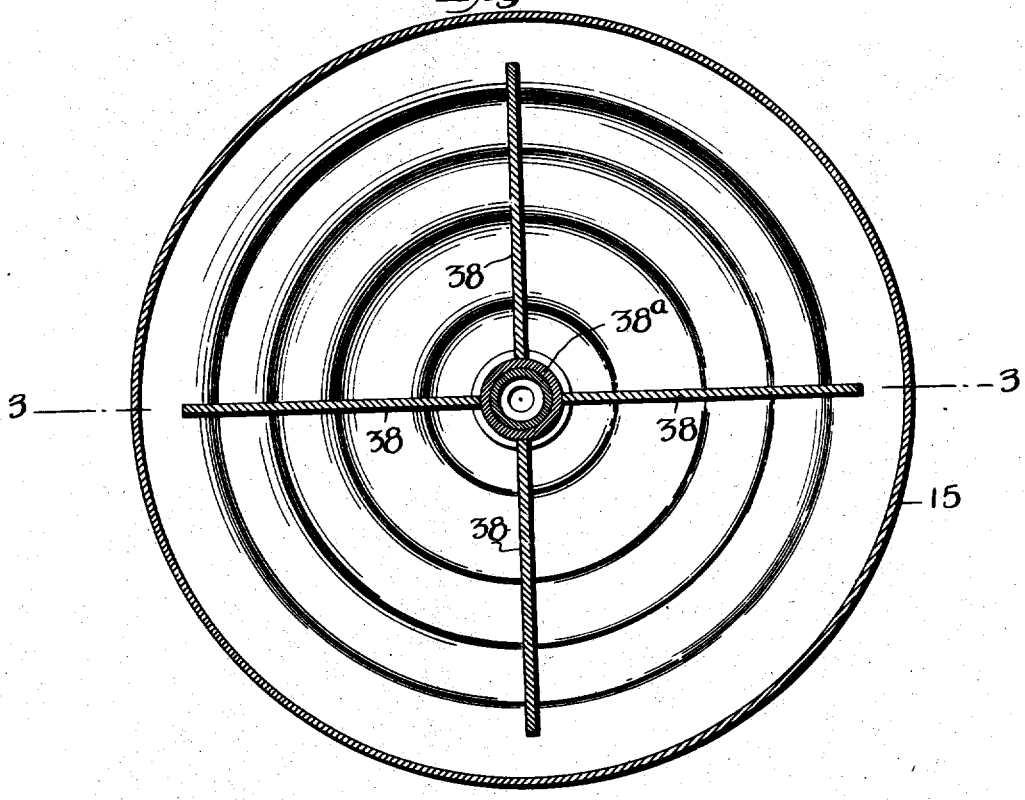
Figure 6:
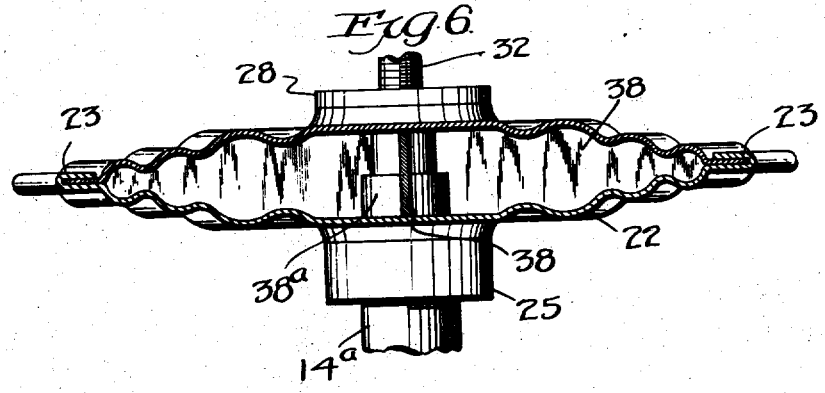
Figure 5:
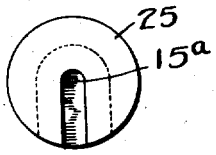

Figure 1 is a sectional view of a steam trap fitted with my improved expansion member, Fig. 2 is a sectional view of another form of trap fitted with said expansion member, Fig. 3 is an enlarged sectional view of the expansion member and its connected parts, this view being taken essentially on the line 3—3 of Fig. 4, Fig. 4 is an enlarged section through the expansion member on the line 4—4 of Fig. 3, Fig. 5 is a detail view showing the manner of connecting the stem of the valve to the expansion member, this device being useful, for example, in the connection shown in Figs. 1 and 2; and Fig. 6 is a sectional view showing one of the radial braces in cross section, said view being taken on the line 6—6 of Fig. 3.

The expansion member as here shown is round and disk shaped, and this is the form which I deem preferable, but I desire it understood that I do not use the disk construction herein as limiting me to an expansion member of the form herein shown and described.

Referring to Fig. 1, which shows my invention embodied in a steam trap, 10 indicates the inlet for the steam and water of condensation, and 11 the outlet for the water of condensation. These connections 10 and 11 communicate with a casing 12, which has a double valve-seat $12^a$, $12^b$ therein, with which operates a double valve 14 controlling the movement of the water of condensation through the trap. 15 indicates the expansion member which is contained in a dome $12^c$ forming a part of the casing 12, and which is connected to the stem $14^a$ of the valve by means of a head $14^c$ on said stem, the head fitting in an under-cut slot $15^a$ forming a part on the under side of the expansion member as best shown in Fig. 5. This allows the stem of the valve to be readily connected with and disconnected from the expansion member, and at the same time it provides for the accurate transmission of the movement from the expansion member to the valve stem and consequently to the valve. $12^d$ indicates a nipple, which facilitates machine work and may, if desired, be used as a discharge. As here shown, it is fitted with a plug $12^e$.

As will be understood from the prior art, particularly my prior patents hereinbefore mentioned, the water of condensation accumulating in the connection 10 will be forced by the steam pressure through the normally open ports $12^a$ and $12^b$, the water passing out through the connection 11. When all the water is discharged and steam begins to pass the ports $12^a$ and $12^b$, this steam will act on the expansion member, causing the same to expand bodily, and this expansive movement closes the valve 14, thus preventing the escape of steam.

The form of trap shown in Fig. 2 involves inlet and outlet connections designated 16 and 17 respectively, which communicate with a casing 18 having a wall therein with a valve seat 19. Co-acting with the valve seat is a valve 20, which controls fluid movement through the casing 18, and this valve is connected with the expansion member 15 in the same manner as described in connection with the construction shown in Fig. 1. In this second form of trap the operation is essentially the same as that above described, the steam forcing the water of condensation past the normally open seat 19 and the steam arriving after the water expanding the disk 15 and causing the valve 20 to seat so as to prevent the escape of steam into the atmosphere, pump or into a hot well or other connection with which the connection 17 may communicate. 18ª indicates a trap for receiving scale, sediment or other foreign matter which may pass into the casing with the water of condensation and steam.

A special construction of the expansion member 15 and its connected parts is illustrated best in Figs. 3 and 4, and is formed with two circular walls 21 and 22 which are preferably composed of high grade sheet phosphor bronze, but which may be composed of any other flexible or durable material. The outer edge of one of said walls, for example the wall 22, is turned up over the edge of the other wall, as indicated at 23, and the two walls are soldered together at their inner surface, as indicated at 24, and the lap 23 is also soldered to the wall 21, thus producing a double soldered joint. The walls 21 and 22 are preferably formed with concentric corrugations outside of their central portion which increase their flexibility. The wall 22 has a central opening therein through which extends a plug 25, and it is in this plug that the before-described undercut slot 15ª is formed. This plug is soldered to the wall 22 inside, as indicated at 26, and is also soldered to the outer side of the wall as indicated at 27, thus effecting a strong and hermetic connection. The wall 21 has a central opening which receives a plug 28, and this plug is soldered to the wall inside, as at 29, and outside as at 30, the same as the plug 25. The plugs 25 and 28 have their inner portions lying opposite each other and normally in close proximity, so as to resist any undue collapsing tendency on the part of the expansion member. The plug 28 is formed with a central opening 31 to permit filling the expansion disk with a volatile substance, as will be hereinafter fully set forth. This opening is normally closed by a screw-pin 32 which operates in the internally threaded portion of the opening 31, and which normally is forced tightly into place. 33 indicates a combined stuffing box and locknut, which is threaded on the pin 32 and formed with a chamber 34 to receive a packing substance. By screwing this nut down on the casing of the trap, as shown in Figs. 1 and 2, not only is the packing compressed around the screw-rod so as to form a hermetic joint, but the element 33 binds against the casing forming a lock-nut, which prevents the accidental movement of the screw-pin in the casing. At its upper end the screw-pin is provided with a knurled or milled thrumb-wheel 35, which is formed with a sleeve 36 screwed on the pin 32, and held removably in place by a cotter 37.

Steam traps of the character herein shown and described, are frequently used in services where oil, dirt, scale and other foreign matter pass into the trap to such an extent as to interfere with the free movement of the valve. The expansion member is therefore mounted upon the screw-pin 32 whereby said member and the valve may be raised temporarily to permit steam to blow through the trap and valve opening and clean the valve seat and the interior of the trap from such foreign matter, after which the valve may be adjusted in its proper working position relatively to its seat. The means for raising the expansion member and valve have no relation whatever to the operation of the expansion member in controlling the valve. The expansion member when in operation is entirely automatic of itself under the full range of variations in pressures and temperatures under which the trap is designed to operate, and the means for raising the expansion member may be dispensed with if desired.

In performing its normal functions, the expansion member collapses or contracts bodily to a limited extent. But it is important that the expansion member be protected from undue collapsing so that the valve shall have the same length or stroke of travel with each pulsation of the expanding member under the varying conditions, pressures and purposes to which traps embodying my invention, are subjected. It is important likewise that the expansion member be prevented from unduly collapsing in order that the lower wall of the expansion member carrying the valve shall be held parallel with the upper wall of the expansion member so as to guard against any torsional or tilting strain being exerted upon the flexible portion of the expansion member. If the lower wall of the expansion member is not held parallel with the upper wall, the valve attached to the lower wall of said member will not rest evenly on its seat and will not close the valve opening properly, and the trap will thereby become defective.

The plugs 25 and 28 are not effective to protect the outer portion of the expansion member from collapsing, and I therefore provide a brace 38 in the form of a plate to bear against the upper and lower wall of the expansion member at points removed from the center thereof to hold the lower wall of the expansion member level with the upper wall and prevent any undue collapse of said member particularly at points removed from the center thereof. The brace plates are set edgewise within the expansion member and may be made of thin metal so as not to absorb an undue amount of heat from the liquid within the expansion member. The brace plates as shown in the special construction illustrated in Fig. 3, have a marginal form corresponding to the corrugations in the walls 21—22, and are fitted snugly within the expansion member so that upon any undue movement of the walls of the expansion member toward each other, said walls will engage said brace plates and the further movement of the walls of the expansion member toward each other will be arrested. The brace plates of the construction illustrated in Fig. 4 are disposed radially. Preferably the four plates are formed integral in pairs, the members of each pair being connected by curved portions 38ᵃ which are reduced in width so as to permit said portions to cross each other. These curved portions 38ᵃ surround the inner portions of the plugs 25—28, as shown in Figs. 3 and 4. The expansion member is adapted to be filled through the opening 31ᵃ with a volatile substance. Preferably this is a liquid substance, such as ammonia, and it is my purpose to partly fill the expansion member so that the vapor rising from the volatile fluid upon raising the temperature of the same, will act interiorly on said member to expand it as contra-distinguished from filling said member and expanding the same by a change in the bulk of the substance contained therein. I also charge the expansion member with different kinds of fluid vaporizing or changing in volume under different temperatures and other different conditions. In this manner I provide for the application of the trap more effectually than heretofore, and entirely automatically, no matter what condition arises.

Traps such as those to which my invention relates are subject to varying conditions, pressures and temperatures, and under these varying conditions it is desirable for effective operation to have a number of fluids that will act independently. For example, the trap may be working under a partial vacuum, the pressure being thereby relieved to some extent from the outside of the expansion member in the presence of heat. A fluid in the expansion member of high volatility will then vaporize and cause a pressure expanding the walls and operating the valve. Again, let it be assumed that the same trap with the same expansion member is in service where the vacuum has been lost and it is subjected to atmospheric pressure. The interior pressure of the expansion member is then insufficient to withstand the atmospheric pressure and the walls are compressed and the valve opened until steam comes in contact with the expansion member, causing a second fluid to be vaporized, overcoming the atmospheric pressure, expanding the walls of the expansion member and closing the valve. Again, there are certain conditions where a trap must discharge against slight back pressure. This back pressure has the same effect upon the expansion member of compressing it again to its normal state, even with the first two fluids fully vaporized. This third fluid, or fluids, must then be of a very low volatility, never vaporizing except on a back pressure when the temperature is higher than it could possibly be at atmosphere. After the vaporization of this last fluid it is found in practice that the trap will operate successfully when a back pressure of not more than twenty-five pounds surrounds the disk, thus meeting with the most severe conditions.

In order to enable the vapors generating from the volatile liquids within the expansion member to operate the expansion member and valve effectively under the varying conditions, pressures and temperatures to which traps such as my invention relates are subjected, it is necessary to make the expansion member as sensitive as possible so as to operate under a wide range of pressures and temperatures. The required sensitiveness of the expansion member makes that member more delicate and more readily susceptible of undue and unequal contractions, which tend to cause the flexible portion of the expansion member to become set, and which tend also to tilt the walls of the expansion member and thereby prevent the valve from closing down evenly on its seat, a condition that is not prevented even where stops are arranged at the central portion of the expansion member.

In the construction herein shown and described, the extra sensitiveness and consequent delicacy of the expansion member is compensated for by means of the edgewise brace disposed at points between the central and outer portion of the expansion member, which prevents the wall of the expansion member carrying the valve from collapsing too far inward and also holds said wall level with the oppositely disposed wall of the expansion member, thereby holding the valve level with its seat. By means of such construction I am enabled to make the expansion member more sensitive and easier of operation than any expansion member heretofore used for that purpose, and at the same time stronger and more durable.

Having thus described the preferred form of my invention, what I claim as new and desire to secure by Letters Patent is:—

1. An expansion member for thermostatic controllers, said member having sheet metal walls, of which the one has its edge lapped over the edge of the other, said walls being soldered together at their engaging inner surfaces, and the lapping edge of the first wall being soldered to the outer surface of the second wall.

2. In a thermostatic controller, a chambered expansion member, and a brace located in said member and extending across the interior thereof to engage the walls of said member at various points along the length of the brace, whereby to prevent collapse of said member.

3. The combination with a casing, having an inlet port, an outlet port and a valve opening, of a chambered member expansible bodily along its axial line, and having upper and lower oppositely disposed walls, a brace set edgewise within said member to bear against said walls between the center and periphery thereof, and a valve connected with one of the walls of said expansible member.

4. The combination with a casing, having an inlet port, an outlet port and a valve opening, of a chambered member expansible bodily along its axial line and having upper and lower oppositely disposed walls, a radially disposed brace set edgewise between said walls to bear against said walls between the center and periphery thereof, and a valve connected with said expansible member.

5. In a thermostatic controller, a chambered expansion member, and a radial brace within said member to resist the collapse thereof, said brace being joined in pairs by reduced connecting portions and said reduced connecting portions lying against each other.

6. In a thermostatic controller, a chambered expansion member with an interiorly projecting plug at approximately the center thereof, and radial braces joined in pairs by curved and reduced portions lying against each other and surrounding the inner portion of the plug.

7. In a thermostatic controller, a chambered expansion member with interiorly projecting plugs in its sides, said plugs being juxtaposed to limit the contracting action of said member, and radial projecting braces contained within said member, also to limit the contracting action thereof.

8. In a thermostatic controller, a chambered expansion member with interiorly projecting plugs in its sides, said plugs being juxtaposed to limit the contracting action of said member, and radially projecting braces contained within said member and also to limit the contracting action thereof, said braces being joined in pairs by reduced connecting portions lying against each other and embracing the inner portions of the plugs.

9. In a thermostatic controller, a casing, an expansion member therein, said member being provided with a part having a filling opening, a threaded pin adapted to close said opening, the pin screwing into the casing, and a combined stuffing box and lock nut screwing on the threaded pin and adapted to engage the casing.

10. In a thermostatic controller, a casing, an expansion member, an orifice plug secured in the wall of said member, a threaded rod screwed in the plug to close the orifice thereof, and a combined stuffing box and lock nut screwing on the rod and adapted to engage the casing.

11. In a thermostatic controller, a casing, an expansion member therein, said member being provided with a part having a filling opening, a threaded pin screwing into the casing and adapted to close said filling opening, a combined stuffing box and lock nut screwing on the pin and adapted to engage the casing, a thumb wheel, and means for removably connecting the same with the outer end of the pin.

CLAYTON AUBRA DUNHAM.

Witnesses:
RALPH McCOGUE,
WM. J. TIMMONS.